(12) United States Patent
Okelberry et al.

(10) Patent No.: US 10,782,888 B2
(45) Date of Patent: Sep. 22, 2020

(54) METHOD AND DEVICE FOR IMPROVING FILE SYSTEM WRITE BANDWIDTH THROUGH HARD DISK TRACK MANAGEMENT

(71) Applicant: Cisco Technology, Inc., San Jose, CA (US)

(72) Inventors: Ryan Michael Okelberry, Provo, UT (US); Dana Henriksen, Lindon, UT (US); Mel J. Oyler, Pleasant Grove, UT (US); Hoi-Tauw Jozef Chou, Dublin, CA (US); Kevin Wayne Kingdon, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 16/017,697

(22) Filed: Jun. 25, 2018

(65) Prior Publication Data
US 2019/0265895 A1    Aug. 29, 2019

Related U.S. Application Data

(60) Provisional application No. 62/636,072, filed on Feb. 27, 2018.

(51) Int. Cl.
*G06F 3/06* (2006.01)
*G11B 20/12* (2006.01)
*G06F 11/30* (2006.01)

(52) U.S. Cl.
CPC .......... *G06F 3/0613* (2013.01); *G06F 3/0634* (2013.01); *G06F 3/0647* (2013.01);
(Continued)

(58) Field of Classification Search
None
See application file for complete search history.

(56) References Cited

U.S. PATENT DOCUMENTS 6,327,638 B1 * 12/2001 Kirby ............... G06F 3/0608
                                                                711/4
8,879,180 B2   11/2014 Deki et al.
(Continued)

FOREIGN PATENT DOCUMENTS

WO    2016107390 A1    7/2016

*Primary Examiner* — Kevin Verbrugge
(74) *Attorney, Agent, or Firm* — Merchant & Gould P.C.

(57) ABSTRACT

Various implementations of hard disk track management method, device, and system disclosed herein enable improvements of file system write bandwidth. In various implementations, a method is performed at a disk storage including a file controller controlling a disk drive with a disk platter that is divided into multiple regions including a fast region. In various implementations, the method includes receiving a write request associated with data to be written to the disk drive and in response, determining a disk utilization of the disk drive. In various implementations, the method further includes placing the disk drive in a surge mode to write the data to the fast region upon determining that the disk utilization is above a first threshold, and placing the disk drive in a non-surge mode to write the data to other regions of the multiple regions upon determining that the disk utilization is below a second threshold.

20 Claims, 5 Drawing Sheets

(52) U.S. Cl.
CPC ........ *G06F 3/0676* (2013.01); *G06F 11/3034* (2013.01); *G11B 20/1258* (2013.01); *G11B 2220/2516* (2013.01)

(56) References Cited

U.S. PATENT DOCUMENTS

| | | |
|---|---|---|
| 8,988,805 B1 | 3/2015 | Blair et al. |
| 2002/0095546 A1* | 7/2002 | Dimitri .............. G11B 20/1217 711/112 |
| 2005/0283570 A1* | 12/2005 | Delahunt .............. G06F 3/0613 711/114 |
| 2011/0080820 A1* | 4/2011 | Shim ........................ G11B 5/09 369/53.41 |
| 2011/0320709 A1* | 12/2011 | Han ........................ G06F 3/061 711/114 |
| 2017/0178682 A1 | 6/2017 | Major et al. |
| 2017/0235485 A1 | 8/2017 | Davis et al. |

\* cited by examiner

METHOD AND DEVICE FOR IMPROVING FILE SYSTEM WRITE BANDWIDTH THROUGH HARD DISK TRACK MANAGEMENT

PRIORITY CLAIM

This application claims priority to U.S. provisional patent application No. 62/636,072 filed on Feb. 27, 2018, the contents of which are hereby incorporated by reference.

TECHNICAL FIELD

The present disclosure relates generally to disk drives for storing data, and in particular, to enabling more efficient writes to magnetic recording apparatus used in cloud-enabled/network-based digital video recording (cDVR) operating environment.

BACKGROUND

Cloud-enabled/network-based digital video recording (cDVR) has been used to facilitate media content recording and delivery. Service providers typically offer cDVR services by storing media content at a network operation center (e.g., in the cloud). cDVR customers can have periods of high usage (e.g., prime time, broadcast of popular events, or favorite shows, etc.) and low usage (e.g., off time or off peak time). During periods of high usage, storage devices in the cloud support high bandwidth for content recording and handle recording requests from many subscribers. A conventional cDVR environment has a cluster of servers associated with the central storage. The cluster of servers is typically sized according to the number of hard disks delivering the required bandwidth.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

As explained above, a conventional cDVR environment often puts in an excessive amount of storage capacity (e.g., space), so that the cluster of servers can provide the high write bandwidth for spurts of high usage, such as prime time recording. However, increasing the disk size in order to accommodate high write bandwidth for short periods of prime time recording is not cost effective for subscribers. Described herein is a hard disk track management method, device, and system that increases the write bandwidth of a cDVR system for prime time recording with less hard disks. A disk storage including a file controller controlling one or more disk drives, each with a disk platter for the cDVR system. The disk platter is divided into multiple regions (e.g., concentric regions) including a fast region. In some implementations, the fast region is closer to the outer edge of the disk platter. Upon receiving a write request associated with data to be written to the disk drive from the cDVR system, the file controller determines the disk utilization of the disk drive. For example, during prime time recording, when the disk is busy serving high priority requests including write requests, the disk utilization is high. In contrast, during off time, the disk may be idle. As such, the disk utilization is low. Based on the disk utilization, the file controller places the disk in a surge mode, where data is written to the fast region, or in the non-surge mode, where data is written to non-fast regions. Relative to conventional cDVR methods, devices, and systems, a cDVR cluster with a file system using the hard disk track management described herein can support more subscribers with less hard disks, thus lowering the overall cost to the subscribers.

EXAMPLE EMBODIMENTS

Figure 1:
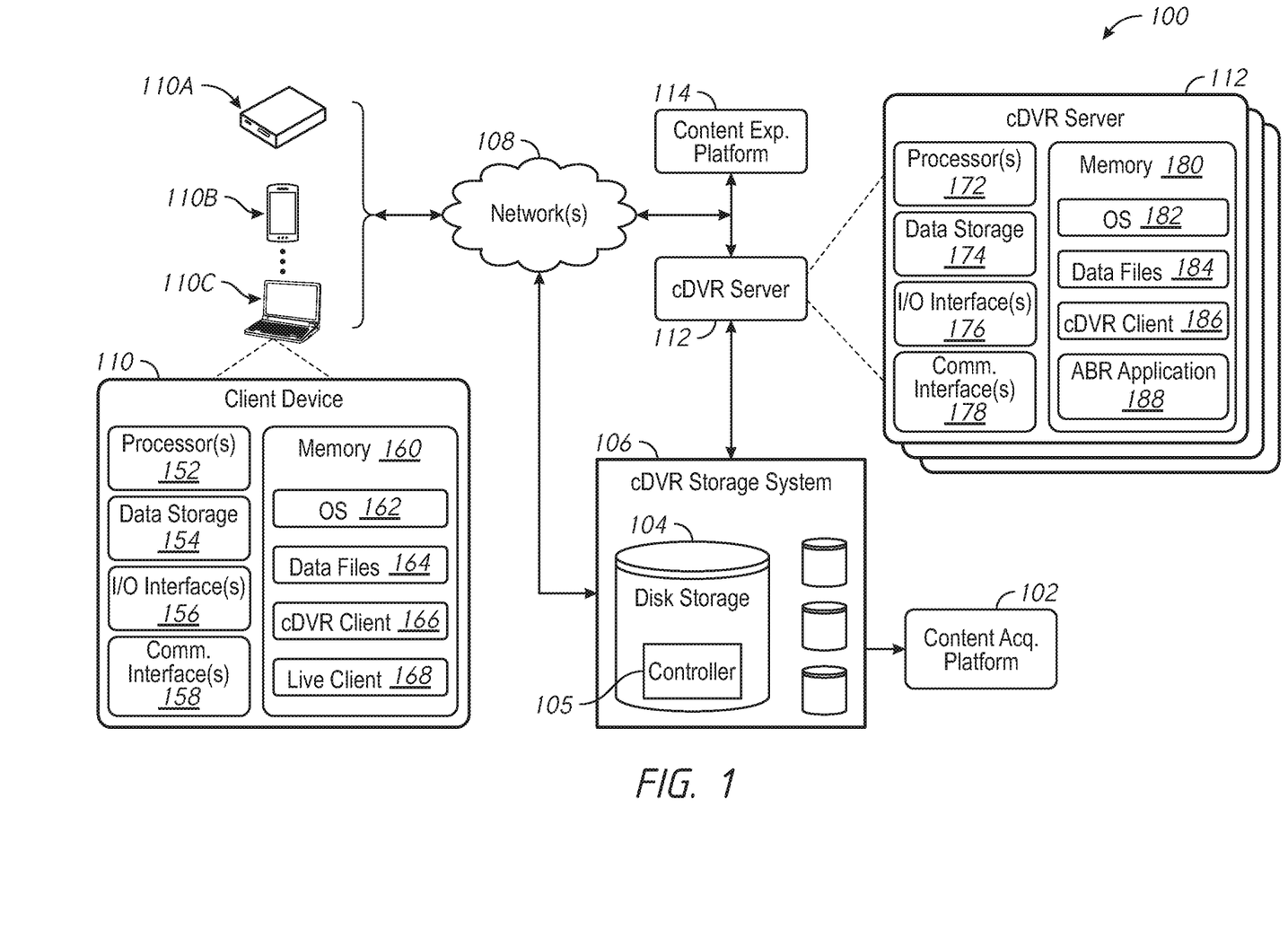
FIG. 1 is a block diagram of a cloud-based digital video recording (cDVR) operating environment in accordance with some implementations.

FIG. 1 is a block diagram of a cDVR operating environment 100 for facilitating media content recording and delivery in accordance with various implementations. Briefly, a content acquisition platform (CAP) 102 can communicate with a cDVR storage system 106, which comprises a plurality of disk storage devices 104. One or more client devices 110 can communicate over one or more networks 108 with a cDVR server 112 and the cDVR storage system 106. The cDVR server 112 can communicate with a content experience platform (CEP) 114.

In some implementations, the CAP 102 comprises one or more computing devices that provide content streaming (real-time and/or non-real-time content delivery), the delivery of stored and/or recorded content, or the like. Additionally, in some implementations, the CAP 102 acquires and transcodes content, segments the received content (e.g., adaptive bit-rate (ABR) technology), and/or protects and encrypts the content. In some implementations, the cDVR storage system 106 includes one or more edge servers, one or more routers and/or bridges, one or more data center servers, one or more content databases, and/or one or more content servers. The various elements of the cDVR storage system 106 can cooperate to receive content from the CAP 102 and appropriately cache the content for access by the one or more client devices 110.

In some implementations, the cDVR storage system 106 stores records associated with user accounts and content assets associated with the user accounts on magnetic recording and reproducing devices, such as the disk storage 104. In some implementations, the disk storage 104 includes one or more hard disk drives. The one or more hard disk drives are controlled by the file controller 105. In some implementations, as the file controller 105 receives instructions through its input/output port (e.g., from the cDVR server 112 and/or the network 108), the file controller 105 controls the write and read of data to and from the disk storage 104. The file controller 105, as will be described in detail below, also controls data relocation in order to improve the performance of the disk storage 104.

As used herein, the file controller 105 is also known as a file manager, a storage manager, a data director, an object controller, a file controller, a director, and the like. In some implementations, the operations performed by the file controller 105 are performed at a level above the disk drive(s) and controls the disk drive(s). In some implementations, the file controller 105 is part of a file system that determines: 1) what the disk utilization is, 2) what the read and write request priorities are, 3) whether or not the disks are in surge mode, 4) which disk address (sector) would be used for storing specific pieces of data, and 5) when and where disk data would be relocated.

Though FIG. 1 illustrates using the disk storage 104 for the cDVR storage system 106, those of skill in the art will appreciate that the disk storage 104 can be used in storage systems other than the cDVR operating environment. Additionally, though FIG. 1 illustrates a hard disk drive (e.g., the disk storage 104), other storage media and devices, such as solid state drives, flash drive, or hybrid disks, can be used for the cDVR storage system 106 as well in addition to or in conjunction with the disk storage 104. Relative to other storage media and devices, a hard disk drive with rotational media is more cost effective.

In some implementations, the one or more client devices 110 communicate over one or more networks 108 with the cDVR server 112 and the cDVR storage system 106. Client devices 110 include, but are not limited to, a set top-box (STB) 110A, smartphones 110B, laptop computers 110C, tablets, electronic book reading devices, processor-based devices, or the like.

In some implementations, the one or more client devices 110 communicate with the cDVR server 112 and the cDVR storage system 106 over one or more types of networks 108, such as a Wi-Fi network, a Wi-Fi Direct network, BLUETOOH, a radio network, a cellular network (e.g., third generation, fourth generation (e.g., LTE), and/or fifth generation), a satellite network, a cable network, a landline-based network, the Internet, intranets, a telephone network, a television network, data networks, or other communication mediums connecting multiple computing devices to one another, as non-limiting examples.

In some implementations, the one or more client devices 110 each include one or more processors 152, one or more memories 160, data storage 154, one or more input/output (I/O) interfaces 156, and one or more communication interfaces 158. The one or more processors 152 can individually comprise one or more cores and can be configured to access and execute, at least in part, instructions stored in the one or more memories 160. The one or more memories 160 comprise one or more non-transitory computer readable storage media (CRSM). The one or more memories 160 can include, but are not limited to, random access memory (RAM), flash RAM, magnetic media, optical media, and so forth. The one or more memories 160 can be volatile in that information is retained while providing power or nonvolatile in that information is retained without providing power.

In some implementations, the one or more client devices 110 can each further include additional data storage 154, such as removable storage and/or non-removable storage including, but not limited to, magnetic storage, optical disk storage, and/or tape storage. In some implementations, the data storage 154 can provide non-volatile storage of computer-executable instructions and other data. The memory 160 and/or the data storage 154, removable and/or non-removable, are examples of CRSM.

In some implementations, the one or more I/O interfaces 156 can also be provided in the client device 110. These I/O interfaces 156 allow for coupling devices, such as keyboards, joysticks, touch sensors, cameras, microphones, speakers, haptic output devices, memories, and so forth, to the client device 110.

In some implementations, the one or more communication interfaces 158 provide for the transfer of data between the client device 110 and another device directly, via a network, or both. In some implementations, the communication interfaces 158 can include, but are not limited to, personal area networks (PANs), wired local area networks (LANs), wireless local area networks (WLANs), wireless wide area networks (WWANs), and so forth. The one or more communication interfaces 158 can utilize acoustic, radio frequency, optical, or other signals to exchange data between the one or more client devices 110 and another device such as an access point, a host computer, a router, an e-reader device, another one of the one or more client devices 110, and the like.

In some implementations, the one or more memories 160 can store instructions for execution by the processor 152 in order to perform certain actions or functions. These instructions can include an operating system (OS) 162 configured to manage hardware resources, such as the I/O interfaces 156, and provide various services to applications executing on the processor 152. The one or more memories 160 can also store data files 164 containing information about the operating system 162.

In some implementations, a cDVR client 166 can be stored in the one or more memories 160. The cDVR client 166 can receive or access information associated with the cDVR operating environment 100. In some implementations, the cDVR client 166 can communicate over the one or more networks 108 with the cDVR server 112 and/or the cDVR storage system 106. In some implementations, the memory 160 has stored therein manifest data accessible to the cDVR client 166, where the manifest data is provided to allow the client device 110 to specify content segments when requesting recorded media data.

In some implementations, a live client 168 can be stored in the one or more memories 160. The live client 168 can receive information collected or generated by the cDVR client 166. In some implementations, the live client 168 can be in communication over one or more networks 108 with the cDVR storage system 106.

According to some implementations, one or more modules can be stored within the one or more memories 160. As used herein, the term module designates a functional collection of instructions that can be executed by the one or more processors 152. For convenience in description, and not by way of limitation, separate modules are described. However, it is understood that in some implementations the various functions provided by the modules can be merged, separated, and so forth. Furthermore, the modules can intercommunicate or otherwise interact with one another, such that the conditions of one affect the operation of another.

In some implementations, the cDVR server 112 can communicate with the cDVR storage system 106 in order to: create user records and/or directories; create asset records and/or directories; create and store manifest files; place entries in the cDVR storage system 106 for one or more segment time periods to be recorded and/or stored; change the state of the asset (e.g., change the state associated with the asset record to "recording" after receiving the first media segment and/or change the state associated with the asset record to "recorded" after receiving the last media segment for the content asset); calculate asset-specific quota data; associate entitlement checking data; and/or schedule and perform quality control for content assets. In some implementations, the cDVR server 112 can also perform functionality associated with the cDVR operating environment 100, such as scheduling recordings, quality control checks, entitlement checks, validation checks, and/or the like.

In some implementations, the one or more cDVR servers 112 can each include one or more processors 172, one or more memories 180, data storage 174, one or more input/output (I/O) interfaces 176, and one or more communication interfaces 178. The one or more processors 172 can individually comprise one or more cores and can be configured to access and execute, at least in part, instructions stored in the one or more memories 180. In some implementations, the one or more memories 180 comprise one or more non-transitory CRSM. The one or more memories 180 can include, but are not limited to, RAM, flash RAM, magnetic media, optical media, and so forth. The one or more memories 180 can be volatile in that information is retained while providing power or non-volatile in that information is retained without providing power.

In some implementations, the cDVR server 112 can further include additional data storage 174 such as removable storage and/or non-removable storage including, but not limited to, magnetic storage, optical disk storage, and/or tape storage. Data storage 174 can provide non-volatile storage of computer executable instructions and other data. The memory 180 and/or the data storage 174, removable and/or non-removable, are examples of CRSM.

In some implementations, the one or more I/O interfaces 176 can also be provided in the cDVR server 112. These I/O interfaces 176 allow for coupling devices, such as keyboards, joysticks, touch sensors, cameras, microphones, speakers, haptic output devices, memories, and so forth, to the cDVR server 112.

In some implementations, the one or more communication interfaces 178 provide for the transfer of data between the cDVR server 112 and another device directly, via a network, or both. The communication interfaces 178 can include, but are not limited to, PANs, LANs, WLANs, WWANs, and so forth. The communication interfaces 178 can utilize acoustic, radio frequency, optical, or other signals to exchange data between the cDVR server 112 and another device, such as a client device 110, another cDVR server 112, a cDVR storage system 106, or the like.

In some implementations, the one or more memories 180 can store instructions for execution by the processor 172 to perform certain actions or functions. These instructions can include an operating system (OS) 182 configured to manage hardware resources, such as the I/O interfaces 176, and provide various services to applications executing on the processor 172. The one or more memories 180 can also store data files 184 containing information about the operating system 182.

According to some implementations, a cDVR client application 186 can be stored in the one or more memories 180. The cDVR client application 186 can receive requests from one or more client devices 110, schedule recordings, perform validation checks, perform quality control checks, and perform other cDVR functionality. In some implementations, the cDVR client application 186 can communicate over the one or more networks 108 with the cDVR storage system 106, the one or more client devices 110, or other devices in the cDVR operating environment 100.

In some implementations, an adaptive bit-rate (ABR) application 188 can be stored in the one or more memories 180. The ABR application 188 can receive information associated with the network connection quality and/or the client device 110 to determine an adaptive bit-rate associated with the client device 110. The ABR application 188 can determine an optimal set of bitrates associated with a particular device class associated with the client device 110 based at least in part on the information associated with the client device 110, the information associated with the network connection quality of the client device 110, the received request from the client device 110, and/or a user account profile associated with the client device 110.

According to some implementations, one or more modules can be stored within the one or more memories 180. As used herein, the term module designates a functional collection of instructions that can be executed by the one or more processors 172. For convenience in description, and not by way of limitation, separate modules are described. However, it is understood that in some implementations the various functions provided by the modules can be merged, separated, and so forth. Furthermore, the modules can intercommunicate or otherwise interact with one another, such that the conditions of one affect the operation of another.

In some implementations, the cDVR server 112 can be in communication with the content experience platform (CEP) 114. The CEP 114 can provide guide data (e.g., linear video metadata management), include application interface servers (e.g., API servers or "app servers" for linear and on-demand services), and/or provide a content and service protection platform (e.g., a combination of privacy, network security, conditional access, and content protection of digital rights components).

In some implementations, the cDVR operating environment 100 can be associated with an ABR live-video distribution system. The ABR live-video distribution system can comprise a CAP 102, one or more storage devices in the cDVR storage system 106, a CEP 114, and/or one or more client devices 110. The cDVR operating environment 100 can comprise one or more cDVR storage systems 106 and one or more cDVR servers 112. The cDVR operating environment 100 can process transport streams of live content, wherein the processing can include encoding, transcoding, and rate-shaping of transport streams.

In some implementations, the cDVR server 112 can manage source data, which can describe where the source is located, and any information that can be requested by a user in association with the content asset (e.g., rating information for the content asset, duration of the asset, date the content asset was recorded, and the like). For example, in some implementations, the cDVR server 112 can store the current segment duration for each of one or more sources. In some implementations, other characteristics can also be stored in association with the content asset. The cDVR server 112 can store information indicating whether to store a segment in a manner so that a user can receive a copy of the segment or if a segment can be shared by multiple users.

In some implementations, the cDVR client 166 can generate and transmit a request to the cDVR client application 186 for a list of content assets associated with the user account associated with the client device 110. The cDVR client application 186 can retrieve or otherwise obtain information from the cDVR storage system 106 and generate a list of all assets associated with the user account and metadata associated with the content assets. For example, the metadata can include, but is not limited to, availability of the content asset, quota information associated with the content asset, or the like. In some implementations, the list of the content assets associated with a user account, recording state, and quota information can be compiled and transmitted to the cDVR client 166 of a client device 110.

Figure 2A:
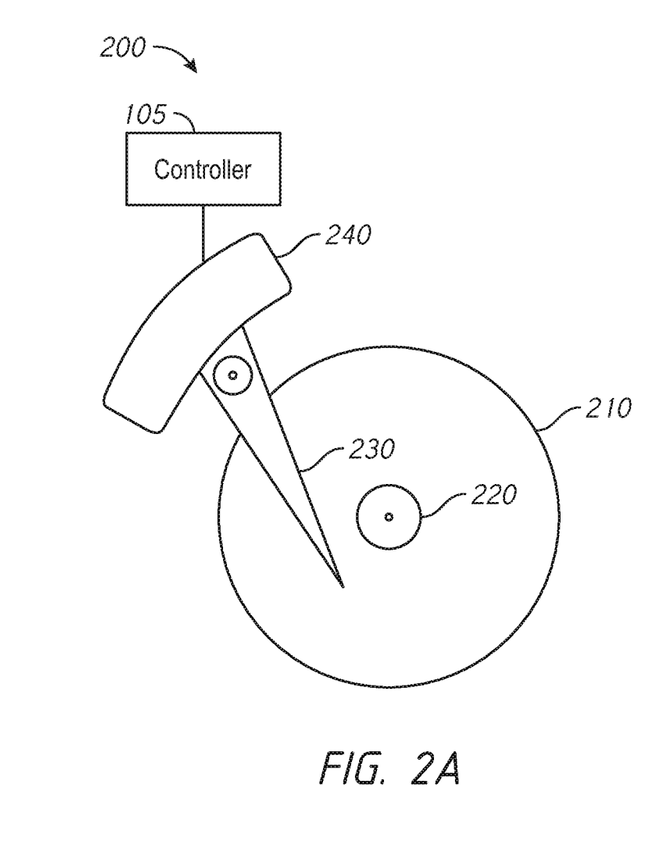
FIG. 2A is a schematic diagram of an exemplary magnetic recording apparatus used in a cDVR storage system in accordance with some implementations.

FIG. 2A is a diagram of an exemplary magnetic recording apparatus 200, in accordance with some implementations. In some implementations, the exemplary magnetic recording apparatus 200 is a hard disk drive that includes a magnetic recording medium (e.g., a circular platter 210), a magnetic head (e.g., the end of a read/write arm 230), and an actuator 240. In some implementations, the magnetic recording apparatus 200 is managed by the file controller 105. Data is recorded in the magnetic recording medium, e.g., on the surface of the circular platter 210. The recording and retrieving of the data are performed through the magnetic head.

In some implementations, the circular platter 210 spins about a spindle 220 and the read/write arm 230 is positioned over the platter 210 by the actuator 240. The file controller 105, as it receives client read/write requests for example, determines which track addresses to use. The disk drive controls the actuator 240 to position the read/write arm 230 at particular physical addresses, where data is to be read from the platter 210 or written to the platter 210. In particular, in some implementations, in order to improve the write bandwidth, the physical addresses to be written are located in certain region(s) based on a mode of the hard disk drive 200. The mode setting and selection will be described in detail below with reference to FIGS. 3A and 3B.

Figure 2B:
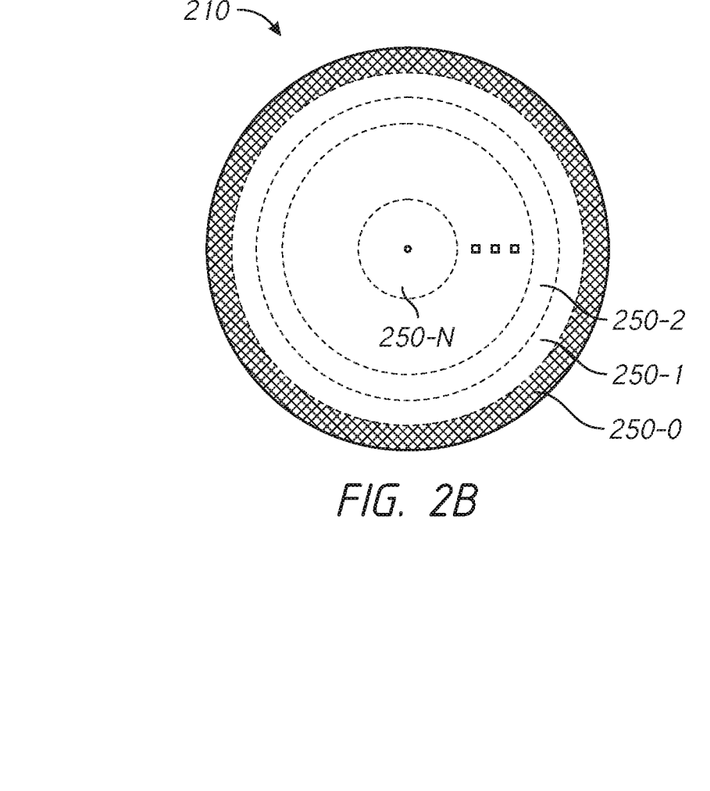
FIG. 2B is a schematic plane view of a hard disk surface in accordance with some implementations.

FIG. 2B is a diagram of the platter 210 with a group of regions 250-0, 250-1, 250-2 . . . 250-N on the surface, in accordance with some implementations. Each region 250 comprises one or more tracks. A track as is known in the art, is a circular (or substantially circular) path on the surface of the patter 210. In some implementations, concentric disk tracks are placed sequentially into different regions. The fastest disk tracks, e.g., those near the outside of the platter 210 go into the first region, e.g., the shaded region 250-0 and/or the region 250-1 etc. The slowest disk tracks, e.g., those near the inside of the disk go into the last region, e.g., the region 250-N. The hard disk as shown in FIG. 2A can be one-sided platter or with tracks as shown in FIG. 2B on both sides. Though FIG. 2B illustrates evenly divided regions 250-0, 250-1, 250-2 . . . 250-N, those of skill in the art will appreciate that the regions 250-0, 250-1, 250-2 . . . 250-N can be divided into variable sizes.

Modern hard disks by design have different performance behaviors depending on which tracks are being accessed. When the platter 210 spins at a constant angular velocity, the outside edge of the platter 210 spins faster than the inside. For example, the region 250-0 spins faster than the inside regions 250-1, 250-2 . . . 250-N. Especially when the density on the platter 210 surface is the same across the disk in accordance with some implementations, the outside edge, e.g., the region 250-0, passes more data across the head in less time. In other words, the tracks on the outer part of the hard disk platter 210 provide faster read/write performance than the tracks on the inner part of the platter 210, e.g., tracks that belong to the region 250-0 provide faster read/write performance than tracks belong to the regions 250-1, 250-2 . . . 250-N. Often the performance difference is more than 2× between the two, e.g., the write bandwidth of region 250-0 is at least twice the write bandwidth of region 250-N.

This performance attribute has not been utilized in conventional file systems. Some existing file systems even the write bandwidth by spreading the writes across different regions, so that the write speed appears to be more consistent and predictable. In some other existing file systems, data is written to the outer tracks of a drive first, hence the drive is filled with data from the outside in. As a result, when the drive is new, data is retained in the outer tracks, and once the outer tracks are filled, the write speed degrades because the data is written to the inner tracks closer to the center of the disk.

In contrast, the file system with the hard disk track management method described herein utilizes the performance attribute of hard disk tracks in order to improve the write bandwidth. As will be described with reference to FIG. 3B, the hard disk track management method described herein further relocates data from the fast region to slower region(s) when there is unused disk bandwidth. As such, the cDVR server with such a file system can support higher write loads for periods of peak demand and lower write loads for non-peak times.

Figure 3A:
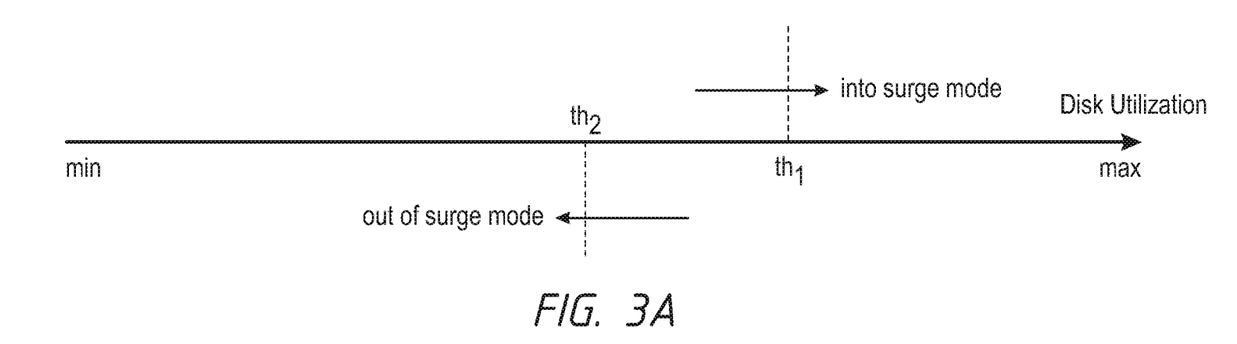
FIG. 3A is a block diagram of an exemplary mode setting method for writes to a disk storage in accordance with some implementations.

FIG. 3A is a block diagram illustrating the mode setting for the disk storage 104 in accordance with some implementations. In some implementations, depending on the current write load, the file system on the disk storage 104 has two write modes. The first is a surge mode, namely, when the disk utilization is above and optionally equal to a first threshold $th_1$. The second is a non-surge mode, namely, when the disks utilization is below and optionally equal to a second threshold $th_2$. The disk utilization determination is described below in detail with reference to FIG. 3B.

When the file system is in the surge mode, data is written to the fastest available region (e.g., the region 250-0 as shown in FIG. 2B unless it is full), so that the maximum bandwidth is available for periods of high demand In some implementations, the system switches back to the non-surge mode when the disk utilization falls below a predetermined level, e.g., $th_2$. In some implementations, the first threshold $th_1$ and the second threshold $th_2$ are different. For example, the file system can switch into the surge mode when the disk utilization is above 92% and then switch out of the surge mode when the disk utilization drops below 85%. Since switching to the surge mode increases the available bandwidth, which in turn lowers the current disk utilization, having the two different configured levels $th_1$ and $th_2$ for the mode switch avoids oscillating between the two modes.

Figure 3B:
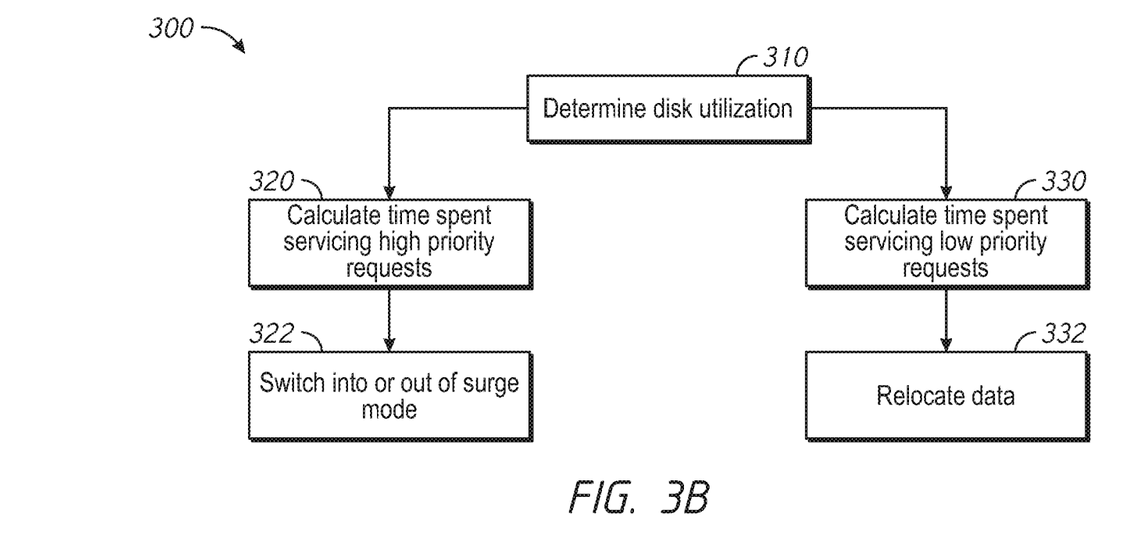
FIG. 3B is a flowchart representation of a method of disk utilization determination and write bandwidth improvement in accordance with some implementations.

FIG. 3B is a flowchart representation of a method 300 of determining disk utilization and utilizing the determined disk utilization for write bandwidth improvement in accordance with some implementations. In various implementations, the method 300 is performed by the file controller 105 of the disk storage 104. In some implementations, the method 300 is performed by processing logic, including hardware, firmware, software, or a combination thereof. In some implementations, the method 300 is performed by a processor or circuitry executing code stored in a non-transitory computer-readable medium (e.g., a memory).

To that end, as represented by block 310, the method 300 includes determining the disk utilization. In some implementations, each request received by the file controller 105 is assigned a priority. Client read and/or write requests typically are assigned high priorities, whereas background activities related requests are assigned low priorities. As represented by block 320, in some implementations, the disk utilization is determined by calculating the time spent servicing high priority requests, such as read and/or write requests.

For example, when the disk storage 104 is nearly idle during off time, not servicing client read and/or write requests, the disk utilization is zero or at a relatively low level. In comparison, when the disk storage 104 is busy servicing client read/write requests during prime time, the disk utilization may be at a relatively high level or close to 100%. In such implementations, when the disk utilization is above the first threshold $th_1$, or below the second threshold $th_2$, as described above with reference to FIG. 3A, the method 300 includes switching the disk storage 104 into or out of the surge mode, as represented by block 322.

In some implementations, the file system tracks how much of the disk utilization comes from low priority disk requests. In such implementations, as represented by block 330, the disk utilization determination includes calculating the time spent servicing low priority requests, such as relocating data from fast region to other regions. In such implementations, when there is sufficient unused disk bandwidth, e.g. when the disk utilization is below a third threshold $th_3$, the method 300 includes relocating the data from the fast region to slow region(s), as represented by block 332.

It should be noted that, in some implementations, the low priority disk requests are not counted when determining whether or not to use the surge mode. Discounting low priority requests allows the low priority disk operations, such as relocating data from the fast regions to the slower regions, to use the full or near-full disk bandwidth without triggering a change to surge mode.

Figure 4:
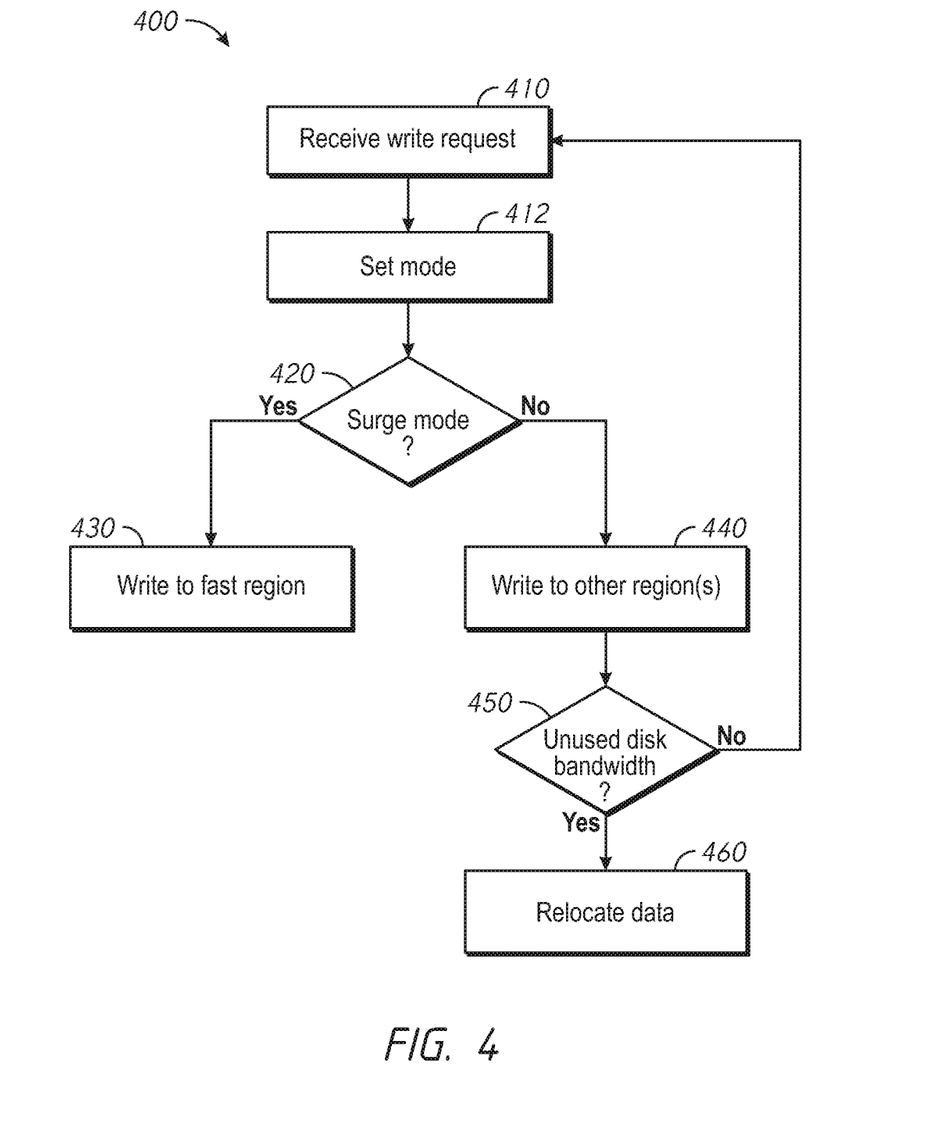
FIG. 4 is a flowchart representation of a method of disk track management in accordance with some implementations.

FIG. 4 is a flowchart representation of a method 400 of hard disk track management in accordance with some implementations. In various implementations, the method 400 is performed by the file controller 105 of the disk storage 104. In some implementations, the method 400 is performed by processing logic, including hardware, firmware, software, or a combination thereof. In some implementations, the method 400 is performed by a processor or circuitry executing code stored in a non-transitory computer-readable medium (e.g., a memory).

To that end, as represented by block 410, the method 400 includes receiving a write request associated with data to be written to the disk storage 104. In some implementations, as represented by block 412, the method 400 includes setting a mode, as described above with reference to FIG. 3B. In some implementations, each request is assigned a priority, such that client read and write requests are assigned higher priorities than requests associated with background activities. In such implementations, determining the disk utilization of the disk drive includes determining the disk utilization based, at least in part, on the time the disk drive services high priority requests, such as the client read and write requests.

In some implementations, based on whether the disk storage 104 is in the surge mode ("Yes" path from block 420), the method 400 includes writing the data to the fastest available region (e.g., the region 250-0 as shown in FIG. 2B, unless it is full) so that the maximum or near-maximum bandwidth will be available for periods of high demand, as represented by block 430. On the other hand, with reference to block 420, if the mode is set to the non-surge mode ("No" path from block 420), the method 400 includes writing the data to other slower region(s), as represented by block 440.

In some implementations, when the file system is in the non-surge mode, the writes are evenly distributed to the other slower regions (e.g., region 250-1, 250-2 . . . 250-N etc. in FIG. 2B) so that the available bandwidth is consistent or nearly-consistent regardless of how full the disks are. Such implementations address the degradation issue that occurs when the system fills up if the file system writes to the faster regions first.

In some implementations, as represented by block 450, the method 400 includes determining whether the system has sufficient unused disk bandwidth for low priority activities, such as relocating data. In some implementations, when the file system is in the non-surge mode and there is sufficient unused disk bandwidth ("Yes" path from block 450), the method 400 includes using at least a portion of the unused disk bandwidth to relocate data from the fastest region (e.g., the region 250-0 as shown in FIG. 2B) to the other regions (e.g., the regions 250-1, 250-2 . . . 250-N as shown in FIG. 2B), as represented by block 460. This will free up space in the fastest region for the next period of peak demand. The data relocation is performed at a lower priority so that it will not interfere with higher priority file system activity, such as client reads or writes. Another possible enhancement is to allow the file system to be configured not to use the slowest region until all the other regions are filled. This can be done because it is common to keep storage systems under 90% full, so the slowest region may be left empty. On the other hand, with reference to block 450, if there is insufficient unused disk bandwidth ("No" path from block 450), the method 400 includes circling back to the portion of the method 400 represented by block 410, where the file controller 105 continues to serve the next request.

The system of dual write modes described herein allows the cDVR server to support higher write loads for periods of peak demand and lower write loads for non-peak times. Alternatively, given a specific peak write load target, the system empowers a smaller cluster of servers to support the peak write load. As such, reducing the cluster size decreases both the initial cost of the cluster as well as the on-going costs of running the cluster.

Figure 5:
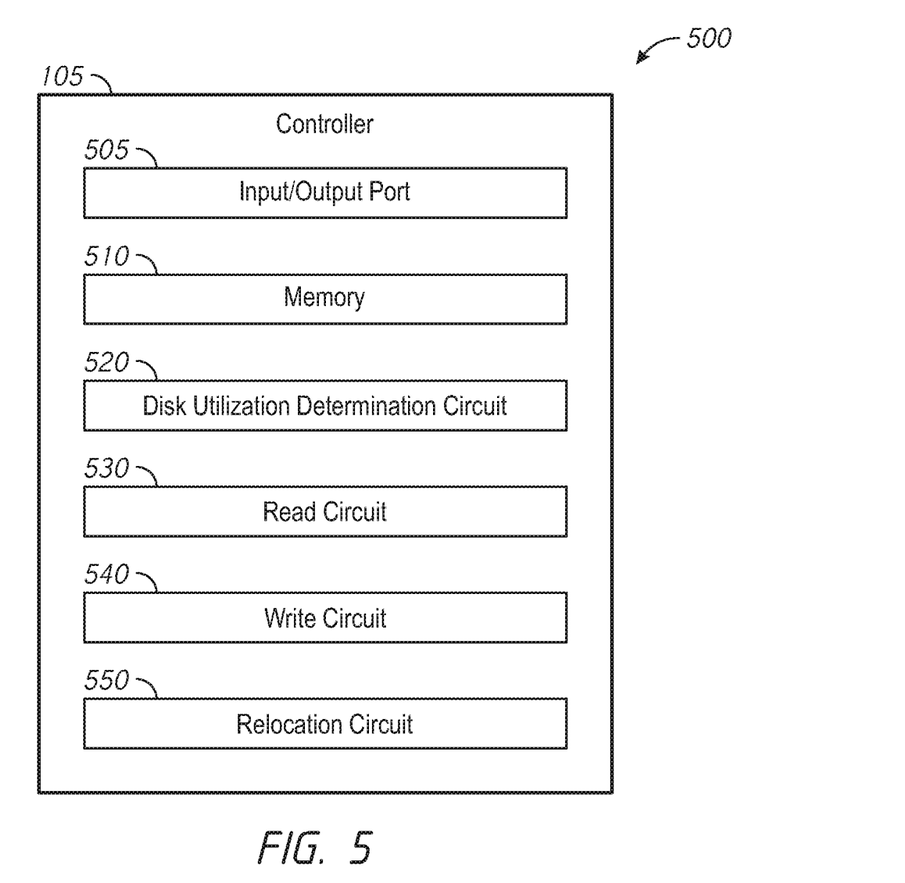
FIG. 5 is a block diagram of an exemplary file controller in accordance with some implementations.

FIG. 5 is a block diagram 500 of an example of the file controller 105 in accordance with some implementations. In some implementations, the file controller 105 includes at least one input/output port 505, a memory 510 (non-transitory and/or transitory), a disk utilization determination circuit 520, a read circuit 530, a write circuit 540, and a data relocation circuit 550. The input/output port 505, the memory 510, the disk utilization determination circuit 520, the read circuit 530, the write circuit 540, and the relocation circuit 550 can be coupled with each other, for example electrically coupled, using a line or a cable, and/or mechanically coupled. In some implementations, the circuits 520, 530, 540, and 550 include logic to perform various operations described herein.

According to various implementations, the file controller 105 receives instructions through the input/output port 505 (e.g., from the cDVR server 112 and/or the network 108 as shown in FIG. 1).

According to various implementations, the memory 510 includes a non-volatile memory.

According to various implementations, the disk utilization determination circuit 520 is configured to determine the disk bandwidth as described above with reference to FIG. 3B.

According to various implementations, the read circuit 530 is configured to read data from the disk storage 104 at the location determined by the file controller corresponding to a client read request received by the file controller 105.

According to various implementations, the write circuit 540 is configured to write data to the disk storage 104 at the location determined by the file controller 105 in accordance with the method 400 described above with reference to FIG. 4.

According to various implementations, the relocation circuit 550 is configured to relocate data from the fast region to the slow region when there is sufficient unused disk bandwidth in the non-surge mode, as described above with reference to FIG. 4.

While various aspects of implementations within the scope of the appended claims are described above, it should be apparent that the various features of implementations described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

What is claimed is:

1. A method comprising:
   receiving a write request associated with data to be written to a disk drive, the disk drive comprising a fast region and other regions;
   determining that the write request is associated with a higher priority;
   determining, in response to determining that the write request is associated with a higher priority, a disk utilization of the disk drive, wherein determining the disk utilization comprises determining a first amount of time spent servicing higher priority requests, and wherein determining the disk utilization further comprises not including a second amount of time spent servicing lower priority requests for determining the disk utilization; and
   determining a write mode for the write request based on the determined disk utilization, wherein determining the write mode comprises:
      determining the write mode to be a surge mode in accordance with a determination that the disk utilization is above a first threshold, wherein in the surge mode the data of the write request is written in the fast region of the disk drive; and
      determining the write mode to be a non-surge mode in accordance with a determination that the disk utilization is below a second threshold, wherein in the non-surge mode the data of the write request is written in the other regions of the disk drive.

2. The method of claim 1, further comprising:
   assigning one or more high priorities to important read and write requests; and
   assigning one or more low priorities to less important read and write requests.

3. The method of claim 1, further comprising in the non-surge mode, relocating the data from the fast region to the other regions based, at least in part, on the second amount of time the disk drive services the lower priority requests.

4. The method of claim 1, wherein the first threshold is different from the second threshold.

5. The method of claim 1, wherein the disk drive spins around a spindle, and the fast region is closest to an outer edge of the disk platter.

6. The method of claim 1, wherein the other regions are sequential and concentric.

7. The method of claim 1, wherein in the non-surge mode the data is written to the other regions comprises evenly distributing the data to the other regions.

8. A disk storage comprising:
   a disk drive with a disk platter divided into multiple regions including a fast region and other regions; and
   a file controller controlling the disk drive configured to:
      receive a write request associated with data to be written to the disk drive;
      determine that the write request is associated with a higher priority;

determine, in response to determining that the write request is associated with a higher priority, a disk utilization of the disk drive, wherein the file controller being configured to determine the disk utilization comprises the file controller being configured to determine a first amount of time spent servicing higher priority requests, and wherein the file controller being configured to determine the disk utilization further comprises the file controller being configured to not include a second amount of time spent servicing lower priority requests for determining the disk utilization;

determine a write mode for the write request based on the determined disk utilization of the disk drive, wherein the file controller being configured to determine the write mode comprises the file controller being configured to:

determining the write mode to be a surge mode in accordance with a determination that the disk utilization is above a first threshold, wherein in the surge mode the data of the write request is written in the fast region of the disk drive; and determining the write mode to be a non-surge mode in accordance with a determination that the disk utilization is below a second threshold, wherein in the non-surge mode the data of the write request is written in the other regions of the disk drive.

9. The disk storage of claim 8, wherein the file controller is further configured to assign priorities to requests received by the disk drive, including:

assigning one or more high priorities to important read and write requests; and assigning one or more low priorities to less important read and write requests.

10. The disk storage of claim 9, wherein the file controller is further configured to, in the non-surge mode, relocate the data from the fast region to the other regions based, at least in part, on the second amount of time the disk drive services the lower priority requests.

11. The disk storage of claim 8, wherein the first threshold is different from the second threshold.

12. The disk storage of claim 8, wherein the disk platter spins around a spindle, and the fast region is closest to an outer edge of the disk platter.

13. The disk storage of claim 8, wherein the multiple regions are sequential and concentric.

14. The disk storage of claim 8, wherein in the non-surge mode the data is evenly distributed to the other regions.

15. A non-transitory computer-readable medium that stores a set of instructions which when executed perform a method comprising:

receiving a write request associated with data to be written to the disk drive;

determining that the write request is associated with a higher priority;

determining, in response to determining that the write request is associated with a higher priority, a disk utilization of the disk drive, wherein determining the disk utilization comprises determining a first amount of time spent servicing higher priority requests, and wherein determining the disk utilization further comprises not including a second amount of time spent servicing lower priority requests for determining the disk utilization;

determining a write mode for the write request based on the determined disk utilization of the disk drive, wherein determining the write mode comprises:

determining the write mode to be a surge mode in accordance with a determination that the disk utilization is above a first threshold, wherein in the surge mode the data of the write request is written in the fast region of the disk drive; and determining the write mode to be a non-surge mode in accordance with a determination that the disk utilization is below a second threshold, wherein in the non-surge mode the data of the write request is written in the other regions of the disk drive.

16. The non-transitory computer readable medium of claim 15, further comprising:

assigning one or more high priorities to important read and write requests; and assigning one or more low priorities to less important read and write requests.

17. The non-transitory computer readable medium of claim 16, further comprising, in the non-surge mode, relocating the data from the fast region to the other regions based, at least in part, on the second amount of time the disk drive services the lower priority requests.

18. The non-transitory computer readable medium of claim 17, wherein relocating, in the non-surge mode, the data from the fast region to the other regions based on the second amount of time the disk drive services the lower priority requests comprises relocating, in the non-surge mode, the data from the fast region to the other regions based on determining that the second amount of time the disk drive services the lower priority requests is less than a third threshold value.

19. The method of claim 1, further comprising relocating the data from the fast region to the other regions based on determining that the second amount of time the disk drive services the lower priority requests is less than a third threshold value.

20. The disk storage of claim 8, wherein the file controller is further configured to relocate the data from the fast region to the other regions based on determining that the second amount of time the disk drive services the lower priority requests is less than a third threshold value.

* * * * *